United States Patent

Reiche et al.

[15] 3,645,181
[45] Feb. 29, 1972

[54] CAMERA WITH AUTOMATIC EXPOSURE TIME DETERMINATION

[72] Inventors: Wilhelm Reiche, Braunschweig; Dieter Mehlitz, Stuttgart-Mohringen both of Germany

[73] Assignee: Voigtlander A.G., Braunschweig, Germany

[22] Filed: July 22, 1969

[21] Appl. No.: 843,426

[30] Foreign Application Priority Data

July 25, 1968 Germany.....................P 17 72 949.6

[52] U.S. Cl..........................95/10 CT, 95/10 C, 95/10 CE, 95/64 R
[51] Int. Cl.........................................................G03b 7/00
[58] Field of Search.......................................95/10 C, 64 C

[56] References Cited

UNITED STATES PATENTS

| | | | |
|---|---|---|---|
| 3,282,179 | 11/1966 | Stimson | 95/10 C |
| 3,332,329 | 7/1967 | Singer | 95/10 C |
| 3,511,574 | 5/1970 | Burgarella | 95/10 C |

*Primary Examiner*—Samuel S. Matthews
*Assistant Examiner*—Michael L. Gellner
*Attorney*—Blum, Moscovitz, Friedman & Kaplan

[57] ABSTRACT

A camera which enables the operator to select an exposure aperture while providing automatically an exposure time influenced at least in part by the selected aperture. An indicating element, such as a lamp, indicates when a given exposure time is reached. A scale of exposure times is available to the operator to be moved with respect to a scale of apertures so as to situate in line with the selected aperture that exposure time of the exposure time scale which corresponds to the given exposure time when the indicating lamp becomes illuminated. This will locate in line with the several apertures of the aperture scale several exposure times which form with these apertures different pairs of exposure times and apertures which may be selectively used instead of the previously selected aperture and the given exposure time which corresponds thereto. Thus, even though the operator is normally unaware of the particular exposure time which corresponds to the selected aperture, it becomes possible for the operator to provide a selected exposure time as well as a selected aperture, if desired.

3 Claims, 4 Drawing Figures

CAMERA WITH AUTOMATIC EXPOSURE TIME DETERMINATION

BACKGROUND OF THE INVENTION

The present invention relates to cameras.

In particular, the present invention relates to that type of camera wherein a structure, such as an electronic structure, automatically sets into the camera an exposure time which will provide a proper exposure with a preselected aperture, this structure also being influenced by such other factors as the particular speed of the film which is used in the camera and the prevailing lighting conditions. Such cameras may have an indicating device for indicating when at least one predetermined given exposure time value is provided by the automatic exposure time setting structure.

Thus, a known camera of the above type is provided with an indicating device which includes a small lamp which becomes automatically illuminated when the automatically determined exposure time for the preselected aperture is at a given exposure time value or is within a given range of exposure times. Such a given, predetermined exposure time value may be, for example, the exposure time of one-thirtieth sec. and the subsequent range of longer exposure times. When the lamp of the indicating device becomes illuminated under these conditions the operator knows that for the given combination of aperture and exposure time, in order to make proper exposures a flash lamp should be used for illuminating the subject to be photographed or the camera should be mounted on a suitable support such as a tripod, since with the relatively long exposure time it will not be possible to make a proper exposure with a hand-held camera.

However, with a camera of this latter type if the previously selected aperture is changed for a larger aperture, the small indicating lamp will automatically become extinguished because of the fact that a shorter exposure time is automatically provided with the larger aperture, so that the above limitations resulting from the given exposure time of one-thirtieth sec. no longer apply. However, under these conditions where the operator changes the previously selected aperture to a larger aperture, the operator simply does not know what the new exposure time is corresponding to the newly selected aperture. As a result the operator does not know whether and to what extent it is possible to change the exposure time in harmony with or to achieve a more favorable aperture setting. For example, the operator will not know whether the exposure time has been reduced sufficiently to enable a moving subject to be photographed without blurring.

It is also known to provide an indicating device where an indicating lamp will become illuminated when the selected aperture requires, in combination with other exposure-determining factors, an exposure time which is shorter than that which the exposure time determining structure can provide. Also in this case the operator does not know what particular exposure time is used in the camera when it is adjusted to a different aperture which extinguishes the indicating lamp under these conditions.

SUMMARY OF THE INVENTION

It is accordingly a primary object of the present invention to provide a camera which will avoid the above drawbacks.

In particular, it is an object of the invention to provide for a camera of the above general type a simple structure which is easily operated for indicating to the operator the particular exposure time which is automatically provided for a newly selected aperture.

Thus, it is an object of the invention to provide for the operator of a camera of the above general type the possibility of selecting from among several pairs of exposure times and apertures that pair formed by a given aperture and a corresponding exposure time which will result in a satisfactory exposure under the prevailing lighting conditions and for the characteristics of the particular object which is photographed.

In accordance with the invention the aperture-setting structure includes a scale of apertures and the structure of the invention includes an exposure time scale which is movable with respect to the scale of apertures. The indicating device indicates when a given exposure time is provided by the automatic exposure time-setting structure. Thus, when this given exposure time is indicated, the operator can move the exposure time scale to a position where the given exposure time is paired or aligned with the selected aperture. The result is that the several exposure time settings indicating on the exposure time scale will become respectively aligned or paired with the several aperture values of the aperture scale, so that the operator can, by consulting the scales, select a different aperture for which an exposure time known to the operator will be automatically provided.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
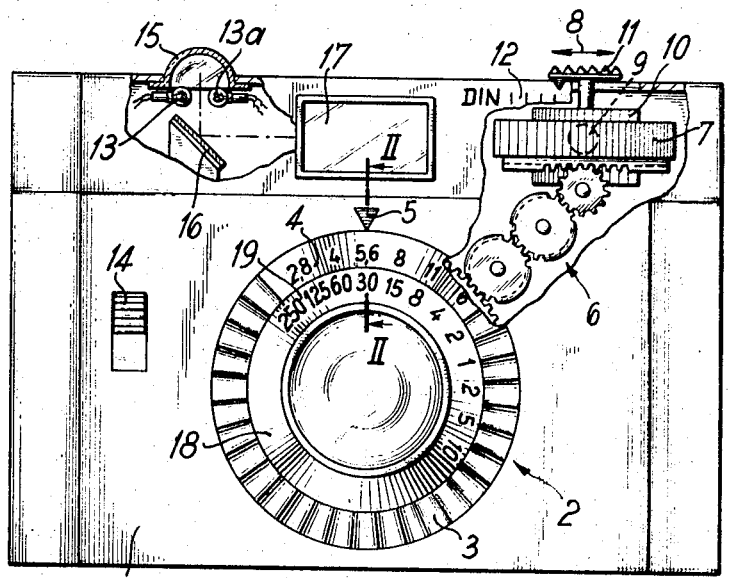
FIG. 1 is a schematic partly broken away and partly sectional front elevation of a camera provided with one embodiment of a structure of the invention.
Figure 2:
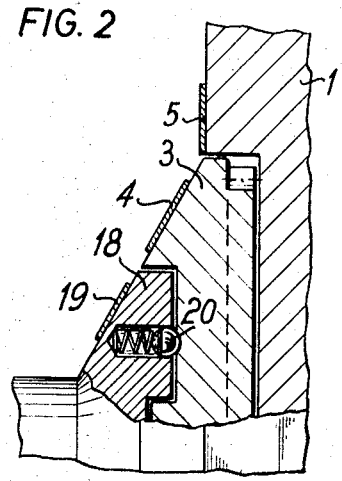
FIG. 2 is a enlarged fragmentary sectional illustration of the scale structure, taken along II—II of FIG. 1.

In the camera structure which is illustrated in FIGS. 1 and 2, the illustrated camera 1 includes a shutter assembly 2 capable of being electronically set in a fully automatic manner. The shutter assembly also accommodates a diaphragm adjustable by way of a ring 3 provided with a scale of aperture settings 4, so that when a selected aperture setting is aligned with the stationary index 5 carried by the front wall of the camera the diaphragm will be set to provide the corresponding aperture. The rotary diaphragm-setting ring 3 is coupled, for example, by way of a gear train 6, with a gray wedge 7 horizontally movable back and forth to the right and left in the direction of the double-headed arrow 8, in response to rotary movement of the aperture-selecting ring 3. The exposure time setting means, which is fully automatic, includes a photosensitive element in the form of a cell 9 which receives light from the exterior after this light has passed through compensating components one of which is formed by the gray wedge 7 which moves in front of the photosensitive element 9 between the latter and the opening, window, or the like through which exterior light enters into the camera to reach the element 9. This element 9, in accordance with the particular stream of light which it receives, will provide in a known way, such as through suitable electronic structure, a corresponding exposure time from among a number of different possible exposure times. An additional gray wedge 10 is situated in front of the cell 9 and is also movable in the opposed directions indicated by the arrow 8. A manually engageable member 11 is operatively connected with this second gray wedge 10 and coacts with a film speed scale 12 so as to set the gray wedge in accordance with the speed of the film which is placed in the camera. Thus, with the illustrated structure the exposure time determining means will be influenced not only by the lighting conditions but also by the selected aperture and the film speed.

An indicating means is operatively connected with the exposure time setting means, and this indicating means includes in the schematically illustrated example a pair of indicating lamps 13 and 13a. These small indicating lamps 13 and 13a are operatively connected with the automatic exposure time setting means in such a way that when the exposure time determining structure is set into operation by actuating the shutter release button 14, one of the other of the lamps 13, 13a will become illuminated when a given exposure time value is formed under the prevailing lighting conditions and with the particular settings of the gray wedges 7 and 10. The illuminated lamps 13 and 13a, one of which may, for example, provide an orange color and the other of which appears white, are visible from the exterior through a covering cap 15 through which the light from the lamps shines. Moreover, the light from the lamps 13 and 13a is deflected by a reflector 16 into the viewfinder 17.

The integrating lamps 13 and 13a may be automatically illuminated by the electronic circuitry of the type shown, for example, in U.S. Pat. 3,511,574. The circuitry of this patent while used for only one lamp can readily be adapted for controlling a pair of lamps such as the lamps 13 and 13a. Also, reference may be had to British Pat. No. 1,043,814, published Sept. 28, 1966, which also discloses suitable electronic circuitry for actuating lamps such as the lamps 13 and 13a. The specific circuitry for energizing these lamps does not form part of the present invention.

With respect to the rendering of the light reflected from the reflector 16 visible in the viewfinder 17, U.S. Pat. No. 3,393,620 shows a structure suitable for this purpose, and in this case also it is emphasized that the specific structure for rendering the light from the reflector 16 visible in the viewfinder does not form part of the present invention and persons skilled in the art will readily know how to receive the light from the reflector 16 so as to render it visible in the viewfinder.

The indicating means formed by the lamps 13 and 13a in the illustrated example operates, for example, in such a way that one of the lamps becomes illuminated when under illuminating conditions of great brightness together with the selected aperture and film speed a proper exposure requires an exposure time which is shorter than the automatic time-setting structure can provide. The other lamp, on the other hand, becomes illuminated when with the prevailing lighting conditions and the preselected aperture and film speed the exposure time is at a given value beyond which it is no longer possible to make a proper photograph with a hand-held camera so that instead it is required to set the camera on a support such as a tripod, or this second lamp becomes illuminated when a flashlamp is required to illuminate the scene which is to be photographed. Such a given value is, for example, one-thirtieth sec. The electronic automatic exposure time setting structure of the shutter can, however, provide substantially longer exposure times, the longest of which may be, for example, 10 seconds.

Thus, upon illumination of one or the other of these lamps the operator is made to realize that with the selected aperture a given time value is provided, but the operator has no way of knowing whether and to what extent the exposure time is changed upon changing the selected aperture setting, although it is possible by changing the aperture setting to extinguish the lamp and thus achieve a proper photograph under the given conditions of lighting, aperture, and film speed.

In order to provide the possibility of indicating to the operator the particular exposure time which will be provided for the new aperture, the structures of FIGS. 1 and 2 includes an adjusting ring 18 which is supported for rotary movement coaxially with the aperture-setting ring 3. This ring 18 carries a scale 19 of exposure times, and this scale of exposure times has it graduations arranged to coact properly with the graduations of the aperture scale 4 of the aperture-setting ring 3. This manually operable rotary ring 18, which has absolutely no operative connection with the shutter and has no influence on the actual exposure time setting structure of the camera, is capable of being releasably held at any one of a number of different selected positions by way of a spring-pressed ball and detent assembly 20, so that the ring 18 will remain in the angular position in which it is placed with respect to the aperture ring 3.

The above structure of FIGS. 1 and 2 operates in the following manner:

When the automatic exposure time setting means operates and for the selected aperture and film speed provides for a given exposure an operation resulting in illumination of one or the other of the lamps 13, 13a, the operator knows that the given predetermined exposure time has been reached. Referring to the example illustrated in FIG. 1, it is assumed that when the selected aperture has a value of 5.6 and that lamp becomes illuminated which indicates that an exposure time of one-thirtieth sec. has been reached, it becomes necessary to provide illumination from a flashlamp for an exposure with the hand-held camera or it is necessary to set the camera on the tripod or other suitable support. Under these conditions the operator can turn the ring 18 so that the exposure time value one-thirtieth sec. is paired or aligned with the selected aperture of the scale 4, so that under these conditions the one-thirtieth graduation of the exposure time scale becomes paired with the aperture setting 5.6. The result is that the series of exposure time graduations become paired or angularly aligned with the series of aperture settings of the scale 4, so that the operator knows the different exposure times which will be provided for the several aperture settings. In this way it becomes possible for the operator to choose a different exposure time-aperture pair. For example, the operator can change the selected aperture to an aperture of 4 to provide an exposure time of one-sixtieth sec. In this way it becomes possible to change the setting of the camera so that it is still possible to make an exposure with a hand-held camera and without using a flashlamp.

On the other hand, if the other lamp has become illuminated under the conditions of the illustrated example where the selected aperture is 5.6, then it is known that the exposure time setting has reached the shortest possible value capable of being automatically set, which may, for example, be a value of one two hundred and fiftieth sec. Thus, under these conditions the operator will place the one two hundred and fiftieth sec. graduation of scale 19 in alignment with the 5.6 graduation of the aperture scale, and now there will be also pairs of exposure times and corresponding apertures from among which the operator may select a longer exposure time by choosing a smaller aperture. For example under these conditions the operator may select an aperture of 11 with which an exposure time of one-sixtieth sec. will be provided.

Thus, the provision of the indicating ring 18 of the invention to indicate those exposure times which will be provided by the automatic exposure time-setting structure upon a change of the selected diaphragm has the important advantage of permitting the operator to know the available different exposure time-aperture pairs which can be used under the prevailing lighting relationships, so that the operator can now select that particular exposure time-aperture pair which appears most favorable for the particular exposure which is to be made. This advantage of the invention is achieved even under the conditions where there is only a single indicating device formed, for example, by a single lamp, to indicate when a given exposure time value is provided by the automatic structure.

Figure 3:
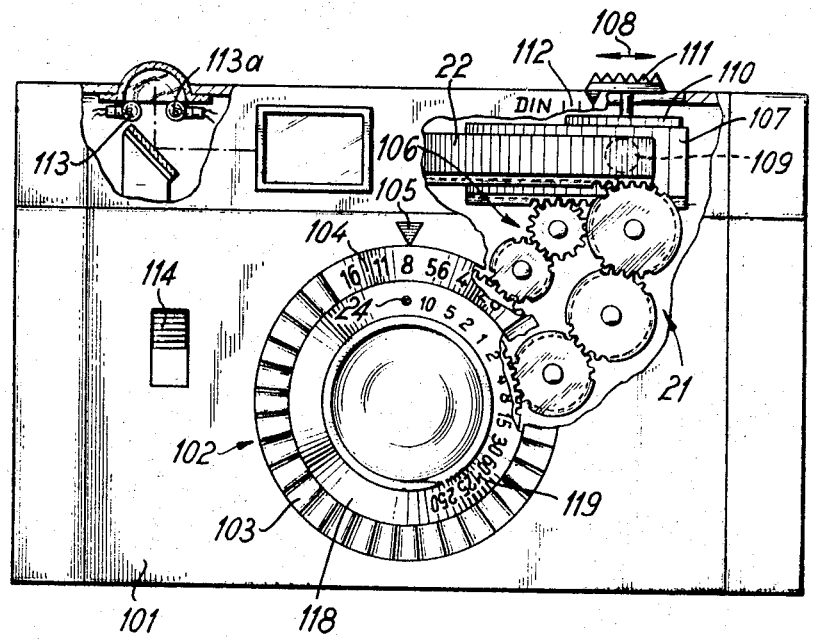
FIG. 3 is a schematic partly broken away and partly sectional front elevation of another embodiment of a camera of the invention.
Figure 4:
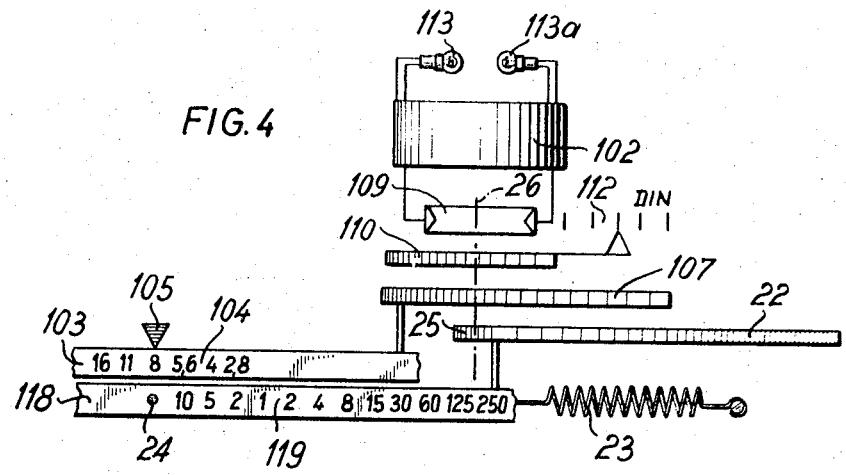
FIG. 4 is a schematic representation showing, in a plan view, the components which coact with a photosensitive component which responds to the lighting conditions.

In the embodiment of FIGS. 3 and 4, the illustrated camera 101 also has a shutter assembly 102 actuated by way of an electronic automatic exposure time-setting means, and the assembly also includes a diaphragm which will set a selected aperture into the camera upon turning of the diaphragm-setting ring 103, provided with a scale 104 of aperture values which move with respect to the stationary index 105. This aperture-setting ring 103 is connected by way of the gear train 106 with the gray wedge 107 which moves in front of the photosensitive cell 109, the gray wedge 107 being movable in the opposed directions indicated by the double-headed arrow 108. Furthermore, there is a second gray wedge 110 in front of the cell 109, capable of being moved by the manually engageable handle 111, also in the direction of the double-headed arrow 108. This second gray wedge coacts with a film speed scale 112, so that through the gray wedge 110 it is possible to influence the exposure time determining structure according to the film speed. Also, as in the embodiment of FIGS. 1 and 2, the embodiment of FIGS. 3 and 4 includes a pair of small indicating lamps 113 and 113a coupled with the electronic, automatic exposure time determining means and operating in the manner described above.

In contrast with the embodiment of FIGS. 1 and 2, with this embodiment of FIGS. 3 and 4, the manually turnable ring 118 which carries the scale 119 of exposure times is operatively connected with the exposure time setting means. Thus, the rotary ring 118 is connected through a gear train 21 with a gray wedge 22 which is also movable in the front of the photosensitive element 109. This gray wedge 22 is also movable in the directions indicated by the double-headed arrow 108. A spring 23 (FIG. 4) forms a spring means which releasably urges and holds the gray wedge 22 and the rotary adjusting ring 118 therewith in a given starting position where a mark 24 on the ring 118 is aligned with the stationary index 105.

As may be seen from FIG. 4, the gray wedge 22 is provided at an end region thereof with a field 25 of predetermined density. The light which reaches the cell 109 passes through this field 25 of the gray wedge 22 when the gray wedge 22 and the scale 119 are in the starting position indicated by alignment of the mark 24 with the index 105. Thus, the light travels along the dot-dash line 26 through the several gray wedges before reaching the photosensitive element 109. As is schematically indicated in FIG. 4, this element 109 is operatively connected with the shutter assembly 102 which includes the automatic electronic exposure time setting means, and the lamps 113 and 113a are also indicated in FIG. 4 schematically connected with the exposure time-setting means of the assembly 102.

This field 25 is spaced from the elongated portion of the gary wedge 22 throughout which the density varies through the entire range of exposure times, and the density of the field 25 corresponds to the density at that region of the entire range of variable density which corresponds to the exposure time value of one-thirtieth sec. Thus, in the illustrated example when the mark 24 is in alignment with the index 105, the gray wedge 22 provides the same influence on the exposure time-setting means as is provided when the graduation 30 of the scale 119 is aligned with the index 105.

The above-described structure of FIGS. 3 and 4 operates in the following manner:

Assuming that the prevailing lighting conditions are such that with the aperture adjusted in the manner illustrated in FIGS. 3 and 4 that one of the lamps 113, 113a becomes illuminated which indicates that the given exposure time of one-thirtieth sec. has been reached. If the operator now turns the ring 118 in opposition to the spring means 24 away from the starting position of the ring 118, the lamp will initially become extinguished because, as is apparent from the drawings, the gray wedge 22 will initially have its portion of lesser density displaced in front of the photosensitive element 109 so that more light will initially reach the cell 109 and the exposure time-setting means will automatically provide a shorter exposure time. However, the operator continues to turn the ring 118, displacing portions of constantly increasing density of the wedge 22 in front of the cell 109, so that the light reaching the latter is continuously weakened, and this rotary movement of the ring 118 is continued until the lamp again becomes illuminated. When the lamp now becomes illuminated for a second time that exposure time graduation of the scale 119 is aligned with the index 105 which corresponds to the exposure time provided by the automatic exposure time-setting means and to the given, predetermined exposure time value corresponding to that at which the lamp becomes illuminated. Now the exposure time graduations and aperture graduations will be paired so that the operator can select from among these pairs a particular pair constituted by an exposure time and aperture setting which make it possible for example, to make an exposure with a time shorter than one-thirtieth sec. without using a flashlamp. Thus, from among the selected pairs the operator will introduce into the camera an aperture setting which will provide through the automatic structure a more desirable exposure time.

After the above operations have been completed, the operator simply releases the ring 118. The spring means 23 will now automatically return the ring 118 and the gray wedge 22 therewith to the starting position.

The above-described structure of FIGS. 1 and 2 is of course considerably simpler than that of FIGS. 3 and 4. However, the structure of FIGS. 3 and 4 is still relatively simple and presents certain advantages which cannot be achieved with the structures of FIGS. 1 and 2.

Thus, in the event that the operations with the embodiment of FIGS. 1 and 2 are not carefully carried out and the operator does not give to the operations the attention required, it can easily happen that the aperture setting ring 3 is turned unintentionally through a given distance beyond the angular position which the ring 3 has upon initial illumination of the lamp. As a result the particular aperture setting does not correspond properly to the given exposure time value of, for example, one-thirtieth sec., and the adjustment of the ring 18 to provide the matching pairs between the scales 4 and 19 by situating the exposure time value one-thirtieth sec. in alignment with the index 5 will not necessarily provide an accurate indication of the actual relationships prevailing, so that the subsequent adjustment may be faulty.

This latter possibility is avoided with the camera of FIGS. 3 and 4 because of the automatic compensation which is inherent in this embodiment. When with this construction after the illumination corresponding to the indication of the given exposure time of one-thirtieth sec. takes place the aperture-setting ring 103 is still turned further in an improper manner, the light which reaches the cell 109 is thus further weakened, and the resulting exposure time may, for example, be one-fifteenth sec., rather than one-thirty sec. However, with the embodiment of FIGS. 3 and 4 during the subsequent turning of the ring 118 resulting in an initial extinguishing of the lamp and then a renewed illumination thereof, when the ring 18 locates the exposure time graduation one-fifteenth sec. in alignment with the index 105 the lamp will again become illuminated, in this particular example. Thus, the brightness of the light which reaches the cell 109 in order to provide an exposure time of one-thirtieth sec. is further weakened as a result of the improper further turning of the ring 103 and movement of the gray wedge 107 so as to further weaken the light so that the exposure time of one-thirtieth sec. is again reached when a part of the gray wedge 22 of a density which is less than its field 25 is moved into the light path 26. In other words the second illumination will only take place when a part of the field of the gray wedge corresponding to an exposure time value of one-fifteenth sec. is located in the light path 26. As a result the aperture scale 104 and the exposure time scale 119 are indeed properly aligned and paired with respect to each other to provide proper pairs of exposure time and apertures, so that the subsequent adjustment will provide proper exposures.

The above-described structures is adapted for use with a given exposure time value of one-thirtieth sec. It is, however, to be understood that the structure can be designed for any other selected value. The field of the gray wedge 22 through which the light passes in the starting position of the gray wedge must then have the same density as that region of the other entire range of densities where when this latter region is situated in the light path 26 the same influence will be placed on the light moving along the path 26 as is provided by the initial starting field of the gray wedge 22 with the proper exposure time graduation of the scale 119 becoming aligned with the index 105.

It is of course also possible to use, instead of gray wedges, other light-regulating structures such as, for example, iris diaphragms, or opaque slides formed with wedge-shaped openings. Also, the exposure time-setting means can be correspondingly influenced through electrical devices such as adjustable resistors, for example.

What is claimed is:

1. In a camera, manually operable aperture-setting means for providing in the camera a selected exposure aperture, exposure time setting means influenced at least in part by said aperture-setting means for automatically setting the exposure time at a value which with the selected aperture will provide a suitable exposure, indicating means for indicating when a given exposure time is provided by said exposure time setting means, said aperture-setting means including a scale of apertures, and an exposure time scale coacting with said aperture scale for setting in line with the selected aperture the given exposure time on the exposure time scale, so as to provide pairs of apertures and exposure times all of which will provide proper exposures, thus enabling the operator to change from the selected aperture to another aperture which will provide through the automatic exposure time setting means a selected exposure time which forms a pair with the newly selected aperture, said exposure time scale being operatively connected with said exposure time setting means for influencing the latter, said exposure time scale having a starting position influencing the exposure time setting means according to the given exposure time and said exposure time scale being movable to another position where it indicates for a given aperture setting the particular exposure time automatically provided by said exposure time setting means, so that thereafter a newly selected pair of apertures and exposure times may be provided.

2. The combination of claim 1 and wherein a spring means urges said exposure time scale to said starting position thereof, and said scale being movable away from its starting position in opposition to said spring means.

3. The combination of claim 1 and wherein said exposure time setting means includes a photosensitive element responding to the lighting conditions, a gray wedge movable with respect to said element for influencing the latter and operatively connected to said exposure time scale to be moved thereby, said gray wedge having a range of varying density and having at one end a density influencing said element according to the starting position of said scale, said range of variable density having a region of the same density as the density at the one end of the gray wedge which is operative when said exposure time scale is in its starting position, and said region of said variable density part of said gray wedge providing when influencing said photosensitive element an exposure time equal to said given exposure time which corresponds to that of said starting position of said exposure time scale.

\* \* \* \* \*